United States Patent
Mandelbaum et al.

(10) Patent No.: US 12,221,817 B2
(45) Date of Patent: Feb. 11, 2025

(54) DOOR LATCH ASSEMBLY

(71) Applicant: Ford Global Technologies, LLC, Dearborn, MI (US)

(72) Inventors: Dylan Mandelbaum, Mountain View, CA (US); Siddharthan Selvasekar, Livermore, CA (US); Sydney Puckett, Oak Park, MI (US); Andres Almeida Senatore, San Jose, CA (US); Michael Steven Medoro, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 633 days.

(21) Appl. No.: 17/003,225

(22) Filed: Aug. 26, 2020

(65) Prior Publication Data

US 2022/0065007 A1 Mar. 3, 2022

(51) Int. Cl.
*E05C 1/16* (2006.01)
*B60R 7/04* (2006.01)
(Continued)

(52) U.S. Cl.
CPC .............. *E05C 1/166* (2013.01); *E05B 83/28* (2013.01); *E05B 83/32* (2013.01); *E05B 85/22* (2013.01);
(Continued)

(58) Field of Classification Search
CPC .......... E05Y 2201/686; E05Y 2600/46; E05Y 2900/538; E05B 83/32; E05B 15/1635; E05B 2015/1642; E05B 2015/165; E05B 83/28; E05B 83/30; E05B 85/22; Y10T 292/0834; Y10T 292/0836; Y10T 292/0838; Y10T 292/0839; Y10T 292/0841; Y10T 292/0969; Y10T 292/097; Y10T 292/0974; Y10T 292/0992; Y10T 292/1014; Y10T 292/1015; Y10T 292/1017; E05C 9/046; E05C 1/00; E05C 1/004; E05C 1/006; E05C 1/08;
(Continued)

(56) References Cited

U.S. PATENT DOCUMENTS 3,751,949 A     8/1973   Castle
5,181,806 A *   1/1993   Grosswiller ........... B65G 51/26
                                                       406/189

(Continued)

FOREIGN PATENT DOCUMENTS

EP     1273746 A1    1/2003
EP     1538288 A1    6/2005
(Continued)

*Primary Examiner* — Tara Schimpf
*Assistant Examiner* — Faria F Ahmad
(74) *Attorney, Agent, or Firm* — Vichit Chea; Price Heneveld LLP (57) ABSTRACT

A latch feature for a door is disclosed herein. The latch feature includes an input body that is operable to move linearly between first and second positions relative to the door. The latch feature also includes an output body. The output body is coupled to the input body by a pivot member that is configured to pivot relative to the output body and the input body to allow the output body to move linearly toward the input body from an outboard position to an inboard position as the input body moves from the first position to the second position.

12 Claims, 6 Drawing Sheets

(51) Int. Cl.
*E05B 83/28* (2014.01)
*E05B 83/32* (2014.01)
*E05B 85/22* (2014.01)
*E05C 1/00* (2006.01)
*E05C 9/04* (2006.01)

(52) U.S. Cl.
CPC ............... *E05C 1/006* (2013.01); *E05C 9/04* (2013.01); *B60R 7/04* (2013.01); *E05Y 2201/686* (2013.01); *E05Y 2600/46* (2013.01); *E05Y 2900/538* (2013.01)

(58) Field of Classification Search
CPC ... E05C 1/085; E05C 1/12; E05C 1/16; E05C 1/166; E05C 9/00; E05C 9/002; E05C 9/04; E05C 9/10; E05C 9/20; B60R 2011/0007
See application file for complete search history.

(56) References Cited

U.S. PATENT DOCUMENTS

| | | | | |
|---|---|---|---|---|
| 6,120,069 | A | 9/2000 | Taranto | |
| 6,318,135 | B1* | 11/2001 | Johnsen | E05B 85/18 |
| | | | | 292/DIG. 31 |
| 7,048,311 | B2 | 5/2006 | Sawatani | |
| 10,053,019 | B2 | 8/2018 | Hodgson | |
| 10,794,097 | B2* | 10/2020 | Ruzich | E05B 5/00 |
| 11,077,778 | B2* | 8/2021 | Miller | B60R 7/04 |
| 2002/0117864 | A1 | 8/2002 | Schlack | E05B 7/00 |
| | | | | 292/263 |
| 2003/0006616 | A1* | 1/2003 | Katoh | B60R 7/06 |
| | | | | 292/32 |
| 2004/0168487 | A1* | 9/2004 | Sawatani | B60R 7/06 |
| | | | | 70/145 |
| 2004/0256859 | A1* | 12/2004 | Yamada | E05B 83/30 |
| | | | | 292/32 |
| 2009/0206625 | A1* | 8/2009 | Toppani | E05B 63/143 |
| | | | | 296/37.12 |
| 2009/0212586 | A1* | 8/2009 | Blanck | B60R 7/04 |
| | | | | 296/37.8 |
| 2011/0174027 | A1* | 7/2011 | Ookawara | E05C 9/047 |
| | | | | 70/159 |
| 2011/0309640 | A1 | 12/2011 | Matsubara | |
| 2014/0150505 | A1* | 6/2014 | Shimizu | E05C 9/043 |
| | | | | 70/344 |
| 2014/0152026 | A1* | 6/2014 | Cinco | E05B 83/28 |
| | | | | 292/139 |
| 2015/0008680 | A1* | 1/2015 | Suzuki | E05B 83/30 |
| | | | | 292/32 |
| 2015/0231906 | A1* | 8/2015 | Iketani | G03G 21/1633 |
| | | | | 292/161 |
| 2016/0339848 | A1* | 11/2016 | Hodgson | E05B 65/0876 |
| 2016/0340942 | A1* | 11/2016 | Anderson | E05B 83/28 |
| 2017/0009496 | A1* | 1/2017 | Nakasone | E05C 9/04 |
| 2017/0067274 | A1* | 3/2017 | Yano | E05C 3/34 |
| 2018/0194295 | A1* | 7/2018 | Jones | B60R 7/04 |
| 2018/0230720 | A1* | 8/2018 | Liu | E05B 83/30 |
| 2018/0274273 | A1* | 9/2018 | Anderson | E05B 17/203 |
| 2019/0021276 | A1* | 1/2019 | Liang | A01K 1/03 |
| 2019/0040663 | A1* | 2/2019 | Ruzich | B60R 7/04 |
| 2019/0136592 | A1* | 5/2019 | Muntean | E05C 9/085 |
| 2019/0234120 | A1* | 8/2019 | Flaute | E05B 83/30 |
| 2019/0295875 | A1* | 9/2019 | Smith | E05C 9/10 |
| 2020/0291696 | A1* | 9/2020 | Seki | E05B 77/36 |
| 2020/0386021 | A1* | 12/2020 | Minnich | E05B 83/30 |

FOREIGN PATENT DOCUMENTS

| | | |
|---|---|---|
| WO | 2013118326 A1 | 8/2013 |
| WO | 2019118201 A1 | 6/2019 |

* cited by examiner

DOOR LATCH ASSEMBLY

FIELD OF THE DISCLOSURE

The present disclosure generally relates to a door latch assembly. More specifically, the present disclosure relates to a latch assembly for a door of a storage compartment within a vehicle.

BACKGROUND OF THE DISCLOSURE

A vehicle typically includes at least one storage compartment within the vehicle that is accessible through a door coupled to the storage compartment. Storage compartment doors often include a latch assembly with a multitude of parts that cooperate together to latch the door in a closed position. A door latch assembly with fewer components may be desired.

SUMMARY OF THE DISCLOSURE

According to a first aspect of the present disclosure, a door latch assembly includes a door that is operable between open and closed positions. A housing is coupled to the door. A latch feature is coupled to the housing and is operable, if the door is in the closed position, between an engaged condition, wherein the latch feature is engaged with a receiver to retain the door in the closed position, and a disengaged condition. The latch feature comprises an input body that is operably coupled to the housing and movable between first and second positions relative to the housing. Movement of the input body between the first and second positions is constrained to generally linear movement by the housing. The latch feature further comprises an output body that is coupled to the input body by at least one pivot member. The at least one pivot member is configured to pivot to allow the output body to move toward the input body from an outboard position to an inboard position as the input body moves from the first position to the second position. Movement of the output body from the outboard position to the inboard position is constrained to generally linear movement by the housing and prompts the latch feature to enter the disengaged condition if the door is in the closed position.

Embodiments of the first aspect of the present disclosure may include any one or a combination of the following features:
- the input body includes an engagement surface configured to be pushed by a user to move the input body from the first position to the second position;
- the linear movement of the input body from the first position to the second position is generally perpendicular to the linear movement of the output body from the outboard position to the inboard position;
- the at least one pivot member comprises a plurality of pivot members that couple the input body to the output body;
- the at least one pivot member is configured to bias the input body toward the first position and the output body toward the outboard position;
- the output body comprises a pawl configured to engage the receiver in the outboard position of the output body;
- the input body is integrally coupled to the pivot member and the pivot member is integrally coupled to the output body;
- the at least one pivot member comprises a proximal living hinge coupled to the input body and a leaf coupled to the proximal living hinge and extending to a distal living hinge coupled to the output body, wherein the leaf is configured to pivot relative to the input body via the proximal living hinge and pivot relative to the output body via the distal living hinge to accommodate the linear movement of the output body from the outboard position to the inboard position;
- the housing comprises at least one guide feature configured to contact the output body, such that movement of the output body from the outboard position to the inboard position is constrained by the guide feature to linear movement, and a brace feature configured to contact the leaf of the at least one pivot member and exert a force on the leaf as the input body moves from the first position to the second position to induce pivotal movement of the leaf relative to the input body via the proximal living hinge; and
- the door is pivotably coupled to a center console of a vehicle and configured to provide access to a receptacle of the center console in the open position, wherein the receiver is coupled to the center console.

According to a second aspect of the present disclosure, a latch feature includes an input body operable to move linearly relative to a housing between first and second positions. At least one first pivot member includes a first proximal living hinge coupled to the input body and a first leaf coupled to the first proximal living hinge and extending outward to a first distal living hinge. A first output body is coupled to the first distal living hinge and is operable to move linearly toward the input body from an outboard position to an inboard position, as the input body moves from the first position to the second position. The first leaf is configured to pivot relative to the input body via the first proximal living hinge and pivot relative to the first output body via the first distal living hinge to accommodate the linear movement of the first output body.

Embodiments of the second aspect of the present disclosure may include any one or a combination of the following features:
- the movement of the input body from the first position to the second position is generally perpendicular to the movement of the first output body from the outboard position to the inboard position;
- at least one second pivot member comprising a second proximal living hinge coupled to the input body, and a second leaf coupled to the second proximal living hinge and extending outward to a second distal living hinge, and a second output body coupled to the second distal living hinge and operable to move linearly toward the input body from an outboard position to an inboard position as the input body moves from the first position to the second position, wherein the second leaf is configured to pivot relative to the input body via the second proximal living hinge and pivot relative to the second output body via the second distal living hinge to accommodate the linear movement of the second output body, and wherein the first and second output bodies move nearer to each other as the first and second output bodies move from the respective outboard positions to the respective inboard positions;
- the at least one first pivot member comprises a plurality of first pivot members that extend between the input body and the first output body;
- the first proximal and distal living hinges are configured to elastically deform with movement of the input body from the first position to the second position and movement of the first output body from the outboard position to the inboard position and are configured to resiliently bias the input body from the second position toward the first position and the first output body from the inboard position toward the outboard position; and the first leaf is configured to contact a brace feature coupled to the housing as the input body moves from the first position to the second position, and wherein the contact between the brace feature and the first leaf is configured to induce pivotal movement of the first leaf relative to the input body via the first proximal living hinge.

According to a third aspect of the present disclosure, a latch feature for a door includes an input body is operable to move linearly between first and second positions relative to the door, and an output body that is coupled to the input body by a pivot member. The pivot member is configured to pivot relative to the output body and the input body to allow the output body to move linearly toward the input body from an outboard position to an inboard position as the input body moves from the first position to the second position.

Embodiments of the third aspect of the present disclosure may include any one or a combination of the following features:

the input body is integrally coupled to the pivot member and the pivot member is integrally coupled to the output body;

a pawl coupled to the output body and configured to be engaged with a receiver in the outboard position of the output body to maintain the door and a closed position; and the pivot member is configured to contact a brace feature coupled to the door as the input body moves from the first position to the second position, and wherein the contact between the brace feature and the pivot member is configured to induce pivotal movement of the pivot member relative to the input body.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1A-5, a door latch assembly 26 may include a door 18 that is operable between open and closed positions. A housing 22 may be coupled to the door 18. A latch feature 24 may be coupled to the housing 22 and may be operable, if the door 18 is in the closed position, between an engaged condition, wherein the latch feature 24 is engaged with a receiver 30 to retain the door 18 in the closed position, and a disengaged condition. The latch feature 24 includes an input body 32 that is operably coupled to the housing 22 and movable between first and second positions relative to the housing 22. Movement of the input body 32 between the first and second positions is constrained to generally linear movement by the housing 22. The latch feature 24 further includes an output body 46 that is coupled to the input body 32 by at least one pivot member 48. The at least one pivot member 48 is configured to pivot to allow the output body 46 to move toward the input body 32 from an outboard position to an inboard position as the input body 32 moves from the first position to the second position. Movement of the output body 46 from the outboard position to the inboard position is constrained to generally linear movement by the housing 22 and prompts the latch feature 24 to enter the disengaged condition if the door 18 is in the closed position.

Figure 1A:
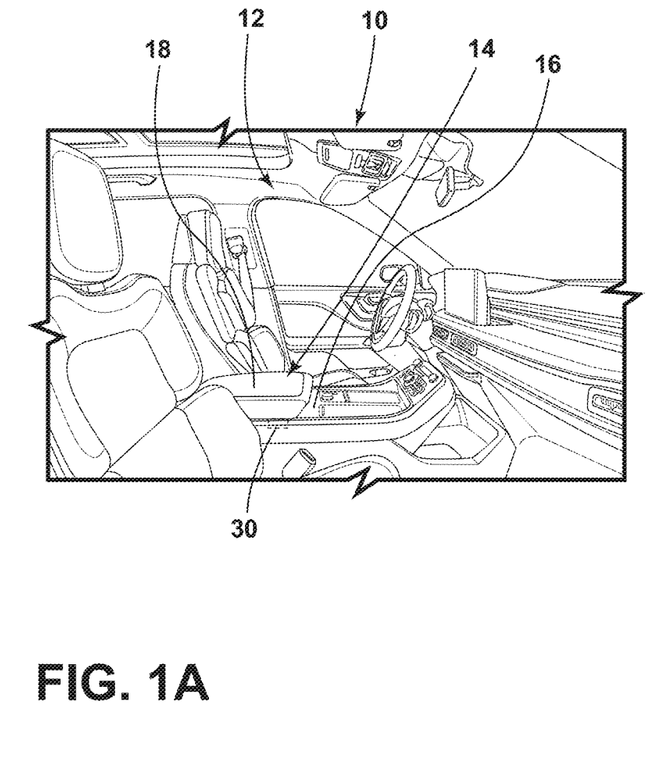
FIG. 1A is a perspective view of a vehicle interior of a vehicle, illustrating a door of a console box in a closed position, according to one embodiment.
Figure 1B:
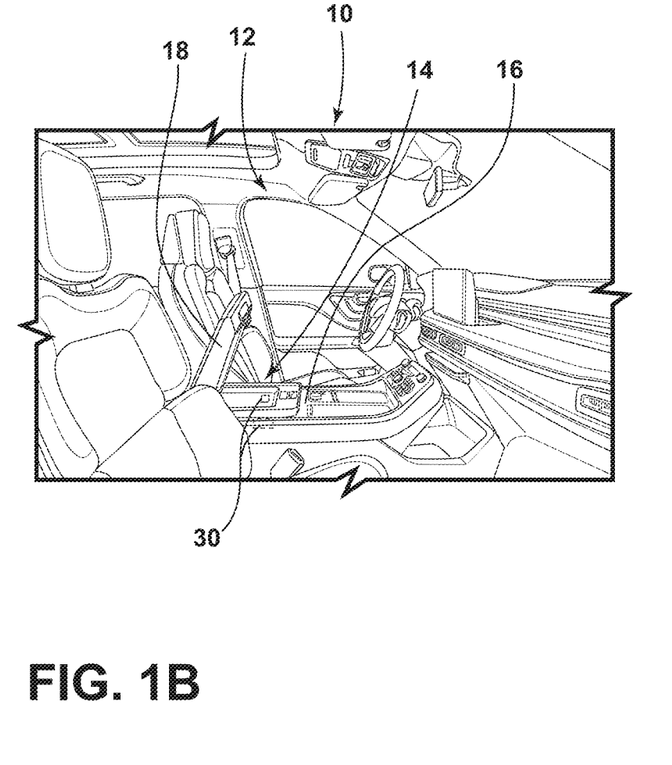
FIG. 1B is a perspective view of the vehicle interior, illustrating the door of the console box in an open position, according to one embodiment.

Referring now to FIGS. 1A and 1B, a vehicle 10 includes a vehicle interior 12. At least one storage compartment 14 is disposed within the vehicle interior 12. In various embodiments, the vehicle interior 12 may include a plurality of storage compartments 14. For example, the vehicle interior 12 may include an overhead console that defines a storage compartment, a glovebox, and a console storage box. In the embodiment illustrated in FIGS. 1A and 1B, the vehicle interior 12 includes the storage compartment 14 in the form of a center console 16. As illustrated, the door 18 is coupled to the center console 16 and operable between a closed position, as illustrated in FIG. 1A, and an open position, as illustrated in FIG. 1B. The door 18 may move between the closed position and the open position by pivoting relative to the storage compartment 14.

Figure 2:
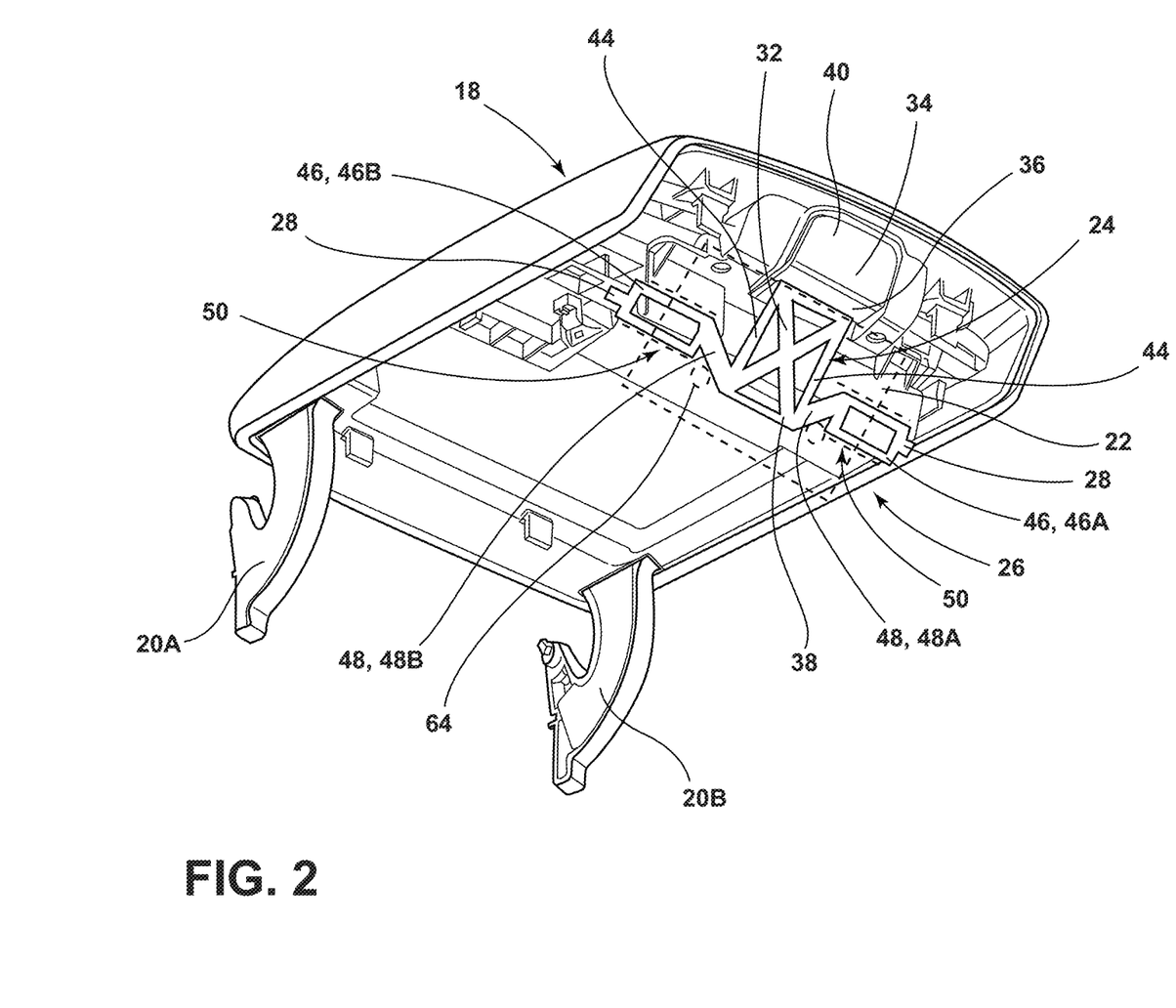
FIG. 2 is a perspective view of the door, illustrating a latch feature and a housing coupled to the door, according to one embodiment.

Referring now to FIG. 2, the door 18 of the storage compartment 14 is embodied as the center console 16 illustrated in FIGS. 1A and 1B. In the depicted embodiment, first and second connectors 20A, 20B are coupled to a first end of the door 18. The first and second connectors 20A, 20B are configured to couple the door 18 to the storage compartment 14 and allow the door 18 to pivot between the open and closed positions relative to the storage compartment 14. As illustrated in FIG. 2, a housing 22 and a latch feature 24 may be coupled to the door 18 at a second end of the door 18 opposite the first end. As discussed further herein, the door 18, the housing 22, and the latch feature 24 may cooperate to form a door latch assembly 26.

Referring now to FIGS. 2-5, the door latch assembly 26 includes the housing 22. The housing 22 may be coupled to the door 18. In some embodiments, the housing 22 may be integrally coupled with the door 18. In other words, the housing 22 and the door 18 may be a single unitary body, such that the housing 22 is a portion of the door 18. In some embodiments, the housing 22 may include a portion of the door 18 in combination with a separate component that is coupled to the door 18.

In various embodiments, the door latch assembly 26 includes the latch feature 24. The latch feature 24 may be coupled to the housing 22 and operable, if the door 18 is in the closed position, between an engaged condition and a disengaged condition. In the engaged condition, the latch feature 24 may be configured to retain the door 18 in the closed position. In the disengaged condition, the latch feature 24 may be configured to not prevent movement of the door 18 from the closed position to the open position. In other words, when the latch FIG. 24 is in the disengaged condition, the door 18 may be operable to move between the open and closed positions. As described further herein, the latch feature 24 may be configured to retain the door 18 in the closed position while the latch feature 24 is in the engaged condition in a variety of ways. For example, the latch feature 24 may include at least one engagement feature 28 that is configured to be engaged with a receiver 30 coupled to the storage compartment 14 when the door 18 is in the closed position, and the latch feature 24 is in the engaged condition. In various implementations, the engagement feature 28 may be one or more of a variety of features configured to engage the receiver 30 coupled to the storage compartment 14 (e.g., latch bolt, latch pawl, etc.). Further, in various embodiments, the receiver 30 coupled to the storage compartment 14 may be one or more of a variety of features configured to receive the engagement feature 28 when the engagement feature 28 is in the engaged condition (e.g., keeper, striker, aperture, slot, etc.).

Figure 3:
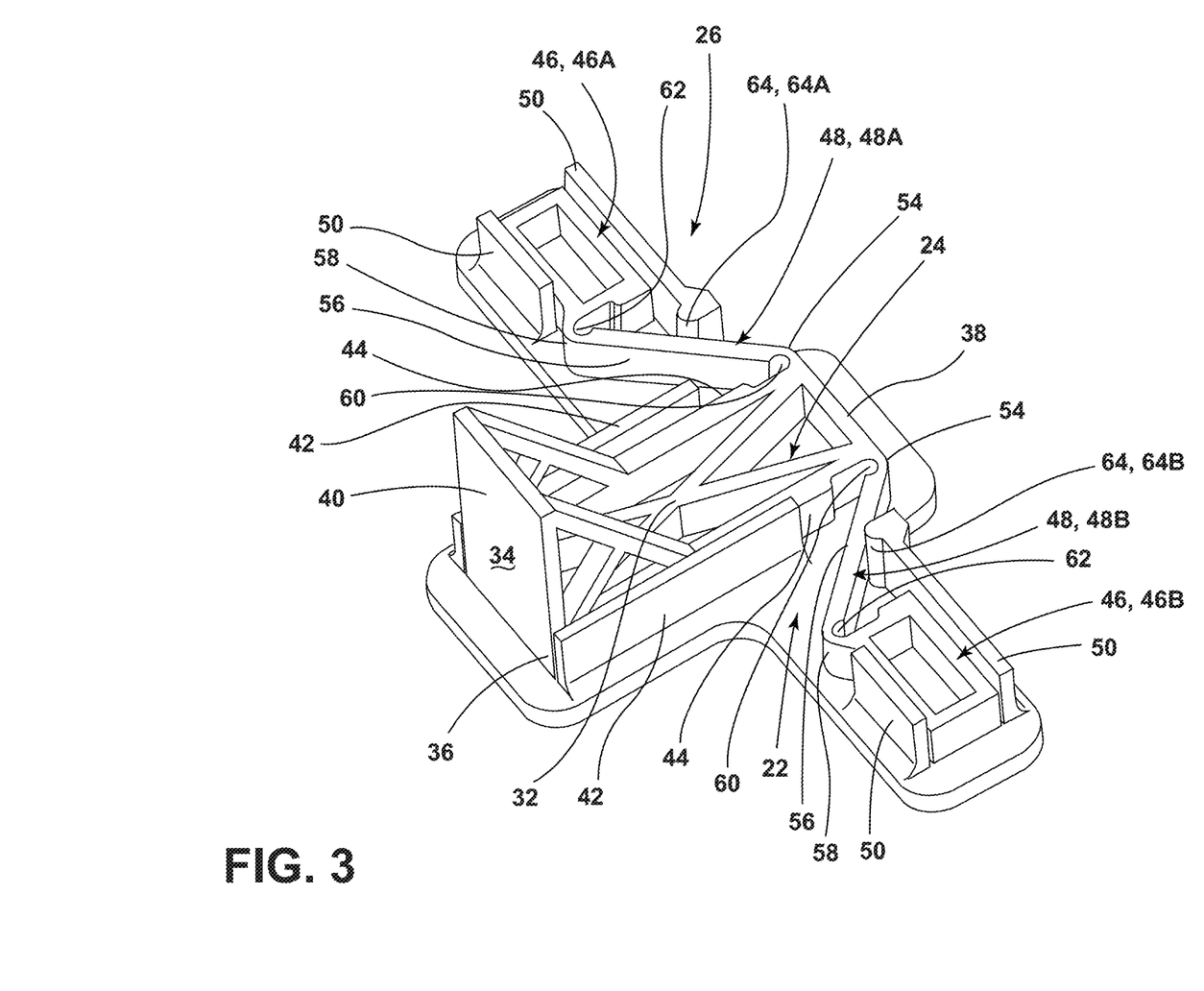
FIG. 3 is a perspective view of the latch feature and the housing, according to one embodiment.
Figure 5:
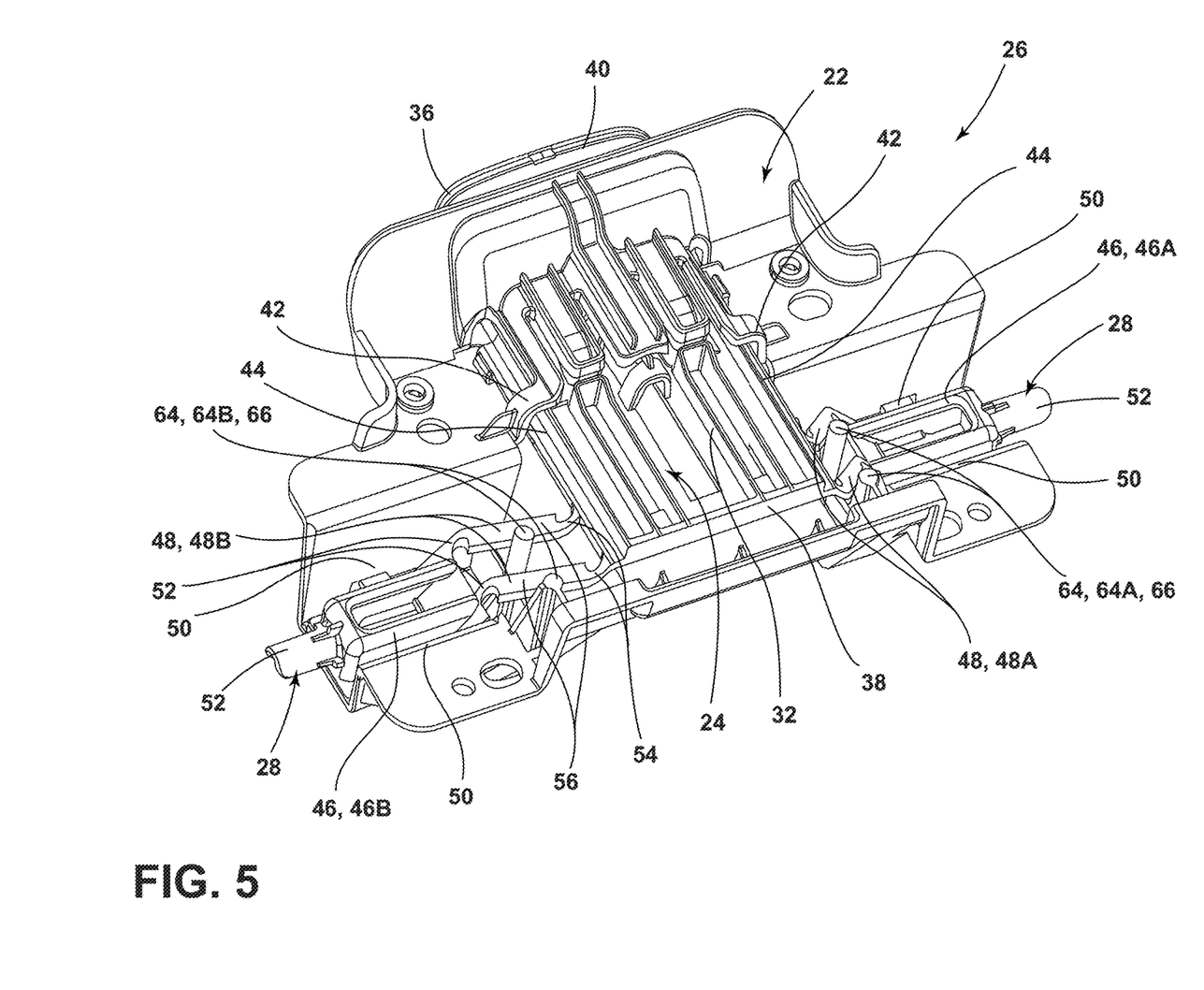
FIG. 5 is a perspective view of the latch feature and the housing, according to one embodiment.

Referring now to FIGS. 2-5, the latch feature 24 may include an input body 32. The input body 32 may be operably coupled to the housing 22 and movable between first and second positions relative to the housing 22. In various embodiments, the input body 32 may be configured to be moved by a user from the first position to the second position. As illustrated in FIGS. 2, 3, and 5, the input body 32 includes an engagement surface 34 configured to be pushed by a user to move the input body 32 from the first position to the second position. The engagement surface 34 may be disposed at a first end 36 of the input body 32, and the input body 32 may extend from the engagement surface 34 at the first end 36 of the input body 32 to a second end 38 of the input body 32 distal from the first end 36. In some embodiments, the engagement surface 34 of the input body 32 may extend outward from the portion of the input body 32 between the engagement surface 34 and the second end 38 to form a tang 40, as illustrated in FIGS. 3 and 5. In some implementations, the engagement surface 34 of the input body 32 may serve as a button that is configured to be pushed by a user, as illustrated in FIG. 2. It is contemplated that, in some embodiments, the input body 32 may be moved between the first and second positions relative to the housing 22 in a variety of ways. For example, in some embodiments, the input body 32 may be pulled from the first position to the second position.

Figure 4A:
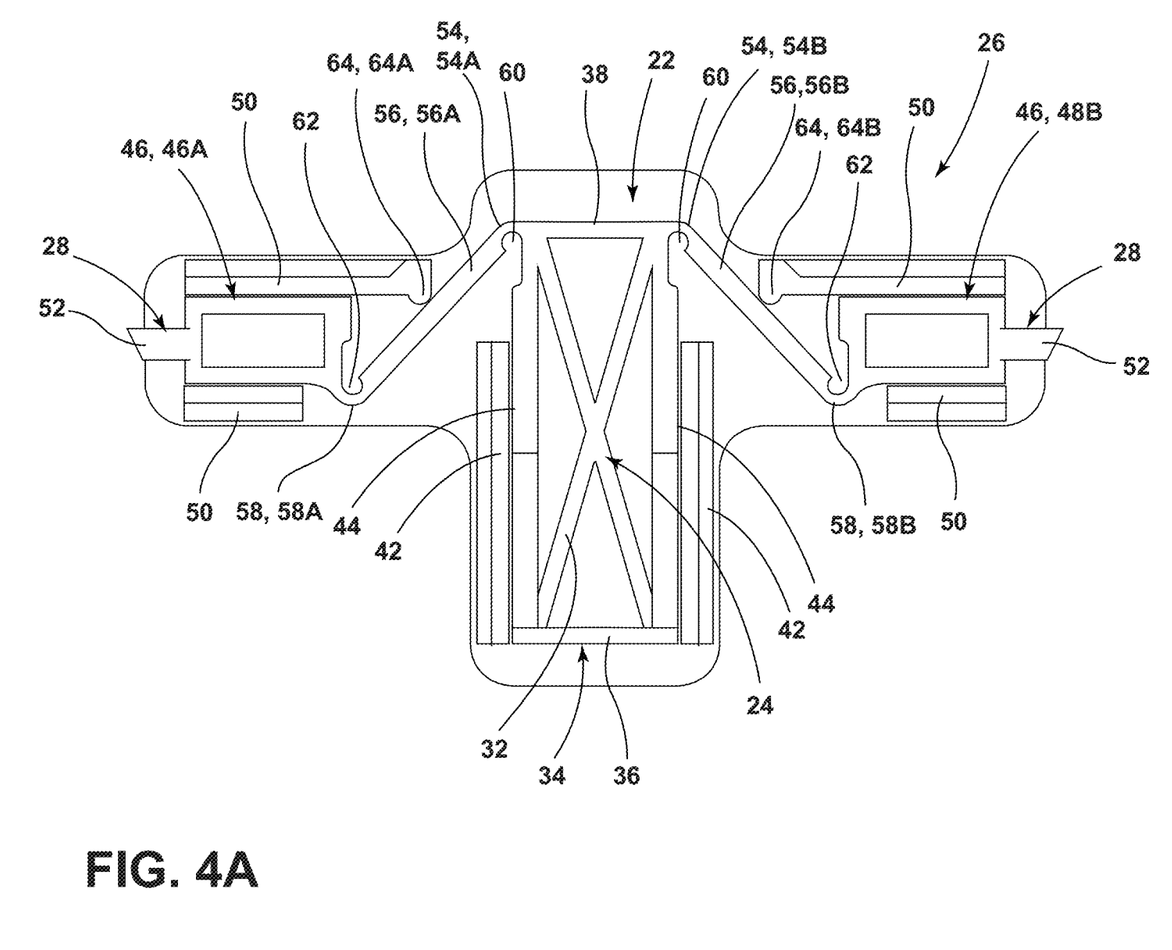
FIG. 4A is an upper elevational view of the latch feature and the housing, illustrating an input body of the latch feature in a first position and first and second output bodies of the latch feature in outboard positions, according to one embodiment.
Figure 4B:
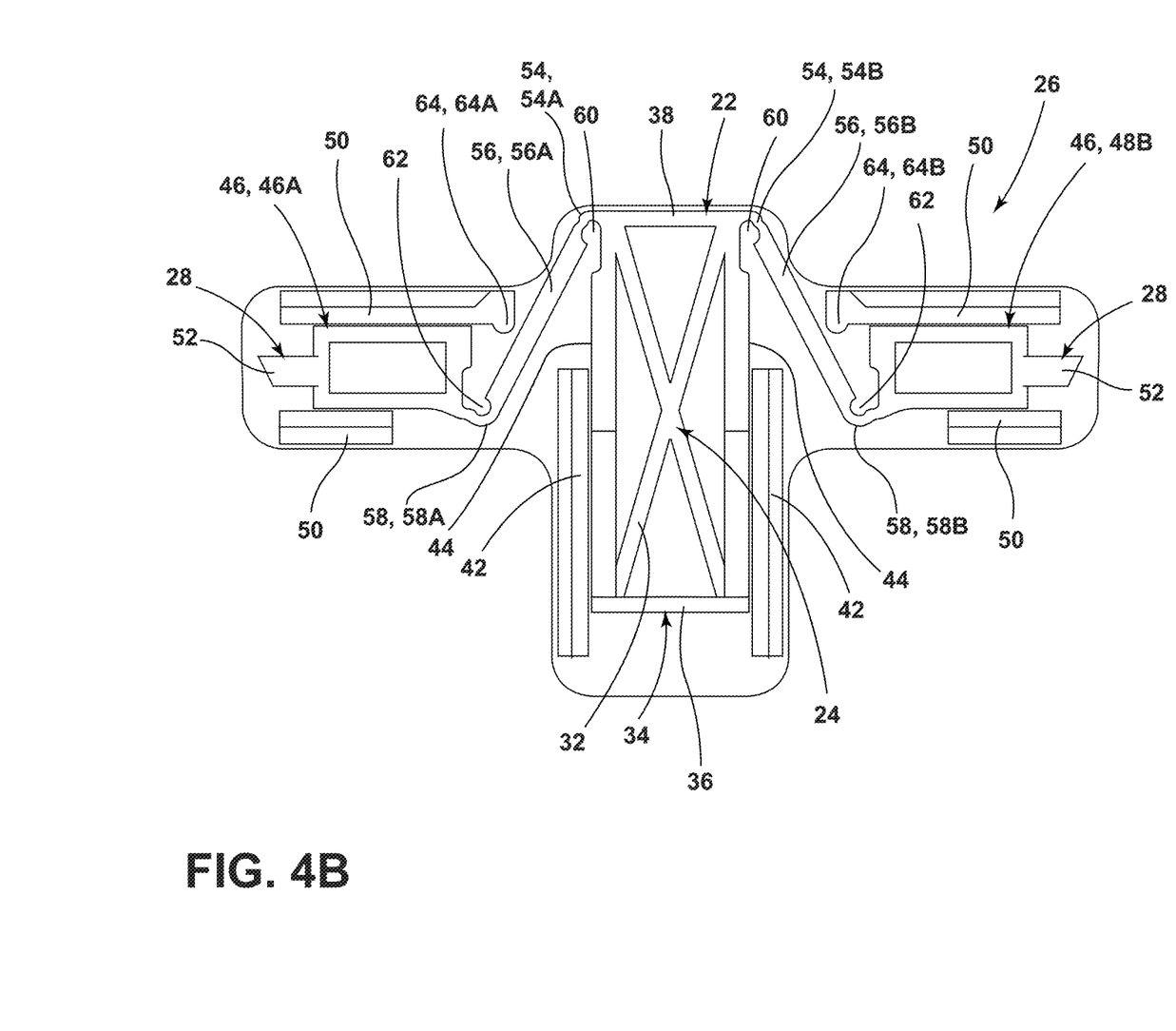
FIG. 4B is an upper elevational view of the latch feature and the housing, illustrating the input body of the latch feature in a second position and the first and second output bodies of the latch feature in inboard positions, according to one embodiment.

In various embodiments, movement of the input body 32 between the first and second positions relative to the housing 22 may be constrained to generally linear movement by the housing 22. In the embodiment illustrated in FIGS. 3-4B, the housing 22 includes guard walls 42 that extend along lateral sides 44 of the input body 32 to generally prevent lateral movement of the input body 32 relative to the housing 22. As illustrated in FIGS. 4A and 4B, the guard walls 42 ensure that the input body 32 moves in a generally linear fashion between the first position (FIG. 4A) and the second position (FIG. 4B). It is contemplated that the housing 22 may constrain movement of the input body 32 to generally linear movement in a variety of ways, in some embodiments. For example, the housing 22 may define a linear track that the input body 32 is configured to slide within from the first position to the second position.

Referring now to FIGS. 2-5, in various embodiments, the latch feature 24 may include at least one output body 46 coupled to the input body 32 by at least one pivot member 48 that is configured to allow the output body 46 to move toward the input body 32 from an outboard position to an inboard position as the input body 32 moves from the first position to the second position. In some embodiments, the latch feature 24 may include a plurality of output bodies 46 coupled to the input body 32 by a plurality of pivot members 48. For example, in the embodiment illustrated in FIGS. 3-4B, the latch feature 24 includes a first output body 46A coupled to the input body 32 by a first pivot member 48A and a second output body 46B coupled to the input body 32 by a second pivot member 48B. As illustrated in FIGS. 4A and 4B, the first and second output bodies 46A, 46B are positioned on opposite sides of the input body 32, such that the first and second output bodies 46A, 46B move toward each other when moving from outboard positions to inboard positions, respectively, and move away from each other when moving from inboard positions to outboard positions, respectively. In some embodiments, a plurality of first pivot members 48A may couple the first output body 46A to the input body 32 and a plurality of second pivot members 48B may couple the second output body 46B to the input body 32. For example, as illustrated in FIG. 5, two first pivot members 48A couple the first output body 46A to the input body 32 and two second pivot members 48B couple the second output body 46B to the input body 32.

Referring now to FIGS. 4A and 4B, in various embodiments, movement of the at least one output body 46 from the outboard position to the inboard position is constrained to generally linear movement by the housing 22. As illustrated in FIGS. 4A and 4B, the housing 22 includes at least one guide feature 50 configured to contact the output body 46, such that movement of the output body 46 from the outboard position to the inboard position is constrained by the at least one guide feature 50 to linear movement. In the depicted embodiment, the at least one guide feature 50 includes walls similar to the guard walls 42 constraining the movement of the input body 32. It is contemplated that, in various embodiments, the at least one guide feature 50 may include at least one of a variety of features configured to constrain movement of the at least one output body 46 between the inboard and outboard positions to linear movement, such as a linear track along which the output body 46 is configured to slide.

As illustrated in FIGS. 4A and 4B, in some embodiments, the linear movement of the input body 32 from the first position to the second position may be generally perpendicular to the linear movement of the output body 46 from the outboard position to the inboard position. As described further herein, pivotal movement of the at least one pivot member 48 relative to the at least one output body 46 and/or the input body 32 may allow the at least one output body 46 to move linearly between the inboard and outboard positions as the input body 32 moves linearly between the first and second positions generally perpendicular to the movement of the at least one output body 46.

In various embodiments, the at least one output body 46 may include the engagement feature 28. For example, as illustrated in FIGS. 4A-5, the first and second output bodies 46A, 46B include pawls 52. In the illustrated embodiments, the pawls 52 extend outward from the portions of the first and second output bodies 46A, 46B that are contacted by the guide features 50 of the housing 22, such that movement of the first and second output bodies 46A, 46B is constrained to generally linear movement. As such, the pawls 52 do not contact the guide features 50 of the housing 22 in the illustrated embodiment; however, it is contemplated that, in some embodiments, the engagement feature 28 may contact the guide features 50 of the housing 22 directly. The engagement feature 28 of the at least one output body 46 of the latch feature 24 is configured for selective engagement with the receiver 30 of the storage compartment 14 when the door 18 is in the closed position, as described herein.

In various embodiments, if the door 18 is in the closed position, the engagement feature 28 of the at least one output body 46 is configured to be engaged with the receiver 30 of the storage compartment 14 when the at least one output body 46 is in the outboard position. Movement of the input body 32 from the first position to the second position prompts the at least one output body 46 to move from the outboard position to the inboard position, which may disengage the engagement feature 28 from the receiver 30 of the storage compartment 14, such that the door 18 may be moved from the closed position to the open position. In some embodiments, wherein the engagement feature 28 includes the pawl 52, movement of the door 18 from the open position to the closed position may cause the pawl 52 to contact the receiver 30 (e.g., striker) and move from the outboard position to the inboard position due to the contact between the pawl 52 and the receiver 30. As described further herein, the output body 46 may be biased toward the outboard position, such that after moving inboard due to the contact with the receiver 30, the at least one output body 46 may move back to the outboard position, such that the pawl 52 is engaged with the receiver 30 to latch the door 18 in the closed position.

Referring now to FIGS. 3-5, the at least one pivot member 48 couples the at least one output body 46 to the input body 32. As illustrated in FIG. 3, the at least one pivot member 48 may be coupled to the input body 32 proximate to the second end 38 of the input body 32 that is distal from the first end 36 where the engagement surface 34 is positioned. In some embodiments, the at least one pivot member 48 may be integrally coupled to the input body 32 and/or the output body 46. In other words, the input body 32, the at least one pivot member 48, and/or the at least one output body 46 may be integrally coupled as a single unitary body.

In various embodiments, the at least one pivot member 48 may include a proximal living hinge 54, a leaf 56, and a distal living hinge 58. The proximal living hinge 54 may be coupled to the input body 32. The leaf 56 may be coupled to the proximal living hinge 54 and may extend outward to the distal living hinge 58. The distal living hinge 58 may be coupled to the at least one output body 46. The proximal and distal living hinges 54, 58 of the at least one pivot member 48 may have a thickness that is less than a thickness of the leaf 56 extending between the proximal and distal living hinges 54, 58. For example, as illustrated in FIG. 3, the proximal living hinge 54 defines a generally rounded cutout 60 that faces toward the input body 32. Further, the distal living hinge 58 of the at least one pivot member 48 defines a generally rounded cutout 62. The cutout 62 of the distal living hinge 58 is disposed on a side of the leaf 56 that is opposite the side of the leaf 56 that the cutout 60 of the proximal living hinge 54 is disposed. In other words, the respective cutouts 60, 62 of the proximal and distal living hinges 54, 58 are on opposite sides of the leaf 56. As illustrated in FIG. 3, in some embodiments, the cutout 62 defined by the distal living hinge 58 may generally face the at least one output body 46 coupled to the distal living hinge 58.

The proximal and distal living hinges 54, 58 are configured to elastically deform to allow the leaf 56 to pivot relative to both the input body 32 and the at least one output body 46. For example, as illustrated in FIGS. 4A and 4B, as the input body 32 moves from the first position (FIG. 4A) to the second position (FIG. 4B), the first and second output bodies 46A, 46B are prompted to move from the outboard positions to the inboard positions due to the first and second output bodies 46A, 46B being coupled to the input body 32 by the first and second pivot members 48A, 48B, respectively. To accommodate the housing 22 constraining both the movement of the input body 32 to linear movement and the movement of the first and second output bodies 46A, 46B to (perpendicular) linear movement, the first and second pivot members 48A, 48B pivot relative to the input body 32 via deformation of the proximal living hinges 54 and pivot relative to the first and second output bodies 46A, 46B via deformation of the distal living hinges 58.

As illustrated in FIGS. 4A and 4B, the first pivot member 48A includes a first proximal living hinge 54A, a first leaf 56A, and a first distal living hinge 58A. Further, the second pivot member 48B includes a second proximal living hinge 54B, a second leaf 56B, and a second distal living hinge 58B. As such, to accommodate the housing 22 constraining the movement of the input body 32 to linear movement and the movement of the first output body 46A to (perpendicular) linear movement, the first pivot member 48A pivots relative to the input body 32 via deformation of the first proximal living hinge 54A and pivots relative to the first output body 46A via deformation of the first distal living hinge 58A. Further, to accommodate the housing 22 constraining the movement of the input body 32 to linear movement and the movement of the second output body 46B to (perpendicular) linear movement, the second pivot member 48B pivots relative to the input body 32 via deformation of the second proximal living hinge 54B and pivots relative to the second output body 46B via deformation of the second distal living hinge 58B.

Referring now to FIGS. 3-5, in various embodiments, the housing 22 may include a brace feature 64 configured to contact the leaf 56 of the at least one pivot member 48 and exert a force on the leaf 56 as the input body 32 moves from the first position to the second position in order to induce pivotal movement of the leaf 56 relative to the input body 32 via the proximal living hinge 54. In various embodiments, the housing 22 may include a plurality of brace features 64. For example, as illustrated in FIGS. 3-4B, the housing 22 includes first and second brace features 64A, 64B that correspond with the leaves 56 of the first and second pivot members 48A, 48B, respectively. Further, as illustrated in FIG. 5, in some embodiments, the housing 22 may include two first brace features 64A that correspond with the leaves 56 of the two first pivot members 48A and two second brace features 64B that correspond with the leaves 56 of the two second pivot members 48B.

In the embodiment illustrated in FIG. 5, the brace features 64 are posts 66 that extend outward from the housing 22 generally perpendicular to the direction of movement of the input body 32 between the first and second positions. In the embodiment illustrated in FIGS. 3-4B, the brace feature 64 is coupled to the guide feature 50 and protrudes outward from the portion of the guide feature 50 that contacts the at least one output body 46. It is contemplated that, in various embodiments, the at least one brace feature 64 may be one or more of a variety of features configured to contact the leaf 56 of the at least one pivot member 48 and exert a force on the leaf 56 as the input body 32 moves from the first position to the second position. In various embodiments, the brace feature 64 may be configured to take on a force that would be applied to the at least one output body 46 by the guide features 50 in the absence of the brace feature 64 by contacting and exerting a force on the leaf 56 to induce pivotal movement of the leaf 56 relative to the input body 32 as the input body 32 moves from the first position to the second position.

In various embodiments, the at least one pivot member 48 may be configured to bias the input body 32 toward the first position and the output body 46 toward the outboard position. For example, the proximal and distal living hinges 54, 58 may be elastically deformed when the input body 32 is in the second position and the at least one output body 46 is in the inboard position, as illustrated in FIG. 4B. Upon removal of the force holding the input body 32 in the second position and/or the at least one output body 46 in the inboard position, the proximal and distal living hinges 54, 58 are configured to resiliently rebound back toward an at rest position and move the input body 32 back toward the first position and the at least one output body 46 back toward the outboard position, as illustrated in FIG. 4A.

In operation of an exemplary embodiment, initially, the door 18 of the center console 16 within the vehicle interior 12 is in the closed position and the latch feature 24 coupled to the door 18 is in a latched position relative to the center console 16, such that the latch feature 24 prevents the door 18 from being moved from the closed position to the open position. In this configuration, the input body 32 of the latch feature 24 is in the first position and the first and second output bodies 46A, 46B of the latch feature 24 are in the outboard positions, such that the pawls 52 coupled to the first and second output bodies 46A, 46B are engaged with corresponding receivers 30 coupled to the storage compartment 14.

Next, the user pushes the engagement surface 34 coupled to the input body 32 of the latch feature 24, which causes the input body 32 to move from the first position to the second position in a linear fashion due to the constraining force of the guard walls 42 of the housing 22 on the input body 32. Movement of the input body 32 from the first position to the second position causes the first and second output bodies 46A, 46B to move toward the input body 32 from outboard positions to inboard positions along linear paths that are perpendicular to the linear movement of the input body 32, due to the constraining forces applied to the first and second output bodies 46A, 46B by the guide features 50 of the housing 22. The first and second pivot members 48A, 48B allow the simultaneous perpendicular movement of the input body 32 and the first and second output bodies 46A, 46B by pivoting relative to the input body 32 via the first and second proximal living hinges 54A, 54B and pivoting relative to the first and second output bodies 46A, 46B via the first and second distal living hinges 58A, 58B. Movement of the first and second output bodies 46A, 46B to the inboard positions disengages the pawls 52 coupled to the first and second output bodies 46A, 46B from the corresponding receivers 30 of the storage compartment 14, such that the door 18 may be pivoted from the closed position to the open position.

The user stops pushing on the engagement surface 34 of the input body 32 as the door 18 is swung from the closed position to the open position. As the user releases the engagement surface 34, the first and second proximal and distal living hinges 54A, 54B, 58A, 58B of the first and second pivot members 48A, 48B resiliently rebound from the deformed positions toward at rest positions, which causes the first and second output bodies 46A, 46B to move from the inboard position to the outboard position and the input body 32 to move from the second position back to the first position.

Next, the user moves the door 18 from the open position back to the closed position. As the door 18 enters the closed position, the pawls 52 coupled to the first and second output bodies 46A, 46B contact portions of the receiver 30 of the storage compartment 14, in such a way that the first and second output bodies 46A, 46B are moved toward the inboard positions as the door 18 moves toward the closed position. As the door 18 enters the closed position, the pawls 52 of the first and second output bodies 46A, 46B rebound back to the outboard position to engage the corresponding receivers 30 of the storage compartment 14 and latch the door 18 in the closed position.

The present disclosure may provide a variety of advantages. First, the integral coupling of the input body 32, the at least one pivot member 48, and the at least one output body 46 may reduce the number of parts necessary to create a functional latch feature 24, which may reduce the cost and complexity of manufacturing the door latch assembly 26. Second, the at least one pivot member 48 being operable to pivot relative to both the input body 32 and the at least one output body 46 may allow the input body 32 to travel linearly from the first position to the second position while the at least one output body 46 travels along a linear path from the outboard position to the inboard position that is perpendicular to the direction of travel of the input body 32. Third, the brace feature 64 coupled to the housing 22 may absorb forces that would be applied to the at least one output body 46 as the input body 32 moves from the first position to the second position, which may decrease wear on the latch feature 24 and increase the usable life of the latch feature 24.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door latch assembly, comprising:
a door operable between open and closed positions;
a housing coupled to the door; and
a latch feature coupled to the housing and operable, if the door is in the closed position, between an engaged condition, wherein the latch feature is engaged with a receiver to retain the door in the closed position, and a disengaged condition, the door being pivotably coupled to a center console of a vehicle and configured to provide access to a receptacle of the center console in the open position, wherein the receiver is coupled to the center console, the latch feature comprising:
an input body operably coupled to the housing and movable between first and second positions relative to the housing, wherein movement of the input body between the first and second positions is constrained to generally linear movement by the housing; and
an output body coupled to the input body by at least one pivot member configured to pivot to allow the output body to move toward the input body from an outboard position to an inboard position as the input body moves from the first position to the second position, wherein movement of the output body from the outboard position to the inboard position is constrained to generally linear movement by the housing and prompts the latch feature to enter the disengaged condition if the door is in the closed position,
wherein the at least one pivot member comprises:
a proximal living hinge coupled to the input body; and
a leaf coupled to the proximal living hinge and extending to a distal living hinge coupled to the output body, wherein the leaf is configured to pivot relative to the input body via the proximal living hinge and pivot relative to the output body via the distal living hinge to accommodate the linear movement of the output body from the outboard position to the inboard position, and
wherein the housing comprises:
at least one guide feature configured to abut the output body, such that movement of the output body from the outboard position to the inboard position is constrained by the guide feature to linear movement; and
a brace feature that abuts the leaf of the at least one pivot member and exerts a force on the leaf as the input body moves toward the second position to induce pivotal movement of the leaf relative to the input body via the proximal living hinge.

2. The door latch assembly of claim 1, wherein the input body includes an engagement surface configured to be pushed by a user to move the input body from the first position to the second position.

3. The door latch assembly of claim 1, wherein the linear movement of the input body from the first position to the second position is generally perpendicular to the linear movement of the output body from the outboard position to the inboard position.

4. The door latch assembly of claim 1, wherein the at least one pivot member comprises:
a plurality of pivot members that couple the input body to the output body.

5. The door latch assembly of claim 1, wherein the at least one pivot member is configured to bias the input body toward the first position and the output body toward the outboard position.

6. The door latch assembly of claim 1, wherein the output body comprises a pawl configured to engage the receiver in the outboard position of the output body.

7. The door latch assembly of claim 1, wherein the input body is integrally coupled to the at least one pivot member and the at least one pivot member is integrally coupled to the output body.

8. A latch feature, comprising:
an input body operable to move linearly relative to a housing between first and second positions;
at least one first pivot member, comprising:
a first proximal living hinge coupled to the input body; and
a first leaf coupled to the first proximal living hinge and extending outward to a first distal living hinge; and
a first output body coupled to the first distal living hinge and operable to move linearly toward the input body from an outboard position to an inboard position as the input body moves from the first position to the second position, wherein the first leaf is configured to pivot relative to the input body via the first proximal living hinge and pivot relative to the first output body via the first distal living hinge to accommodate the linear movement of the first output body, wherein the first leaf abuts a brace feature of the housing as the input body moves toward the second position, and wherein the abutment between the brace feature and the first leaf is configured to induce pivotal movement of the first leaf relative to the input body via the first proximal living hinge.

9. The latch feature of claim 8, wherein the movement of the input body from the first position to the second position is generally perpendicular to the movement of the first output body from the outboard position to the inboard position.

10. The latch feature of claim 8, further comprising:
at least one second pivot member, comprising:
a second proximal living hinge coupled to the input body; and a second leaf coupled to the second proximal living hinge of the at least one second pivot member and extending outward to a second distal living hinge; and a second output body coupled to the second distal living hinge and operable to move linearly toward the input body from an outboard position to an inboard position as the input body moves from the first position to the second position, wherein the second leaf is configured to pivot relative to the input body via the second proximal living hinge and pivot relative to the second output body via the second distal living hinge to accommodate the linear movement of the second output body, and wherein the first and second output bodies move nearer to each other as the first and second output bodies move from the respective outboard positions to the respective inboard positions.

11. The latch feature of claim 8, wherein the at least one first pivot member comprises:

a plurality of first pivot members that extend between the input body and the first output body.

12. The latch feature of claim 8, wherein the first proximal and distal living hinges are configured to elastically deform with movement of the input body from the first position to the second position and movement of the first output body from the outboard position to the inboard position and are configured to resiliently bias the input body from the second position toward the first position and the first output body from the inboard position toward the outboard position.

\* \* \* \* \*